(12) United States Patent
Mamei et al.

(10) Patent No.: US 8,511,641 B2
(45) Date of Patent: Aug. 20, 2013

(54) CONTROL APPARATUS FOR BRAKING VALVES FOR OPERATING MACHINES OR THE LIKE

(75) Inventors: Eronne Mamei, Modena (IT); Enrico Mamei, Modena (IT); Andrea Mamei, Modena (IT)

(73) Assignee: Studio Tecnico 6M S.R.L., Modena (IT)

( * ) Notice: Subject to any disclaimer, the term of this patent is extended or adjusted under 35 U.S.C. 154(b) by 456 days.

(21) Appl. No.: 12/883,353

(22) Filed: Sep. 16, 2010

(65) Prior Publication Data
US 2011/0062355 A1   Mar. 17, 2011

(30) Foreign Application Priority Data
Sep. 17, 2009   (IT) .............................. MO2009A0232

(51) Int. Cl.
*F16K 31/44*   (2006.01)
*F16K 31/62*   (2006.01)

(52) U.S. Cl.
USPC .................. 251/242; 251/236; 324/207.2

(58) Field of Classification Search
USPC ....................................... 192/225
See application file for complete search history.

(56) References Cited

U.S. PATENT DOCUMENTS

| | | | |
|---|---|---|---|
| 5,439,275 A * | 8/1995 | Padula et al. ............... | 324/207.2 |
| 7,170,278 B2 * | 1/2007 | Wohner ..................... | 324/207.2 |
| 7,408,341 B2 * | 8/2008 | Okuya et al. ............... | 324/207.2 |
| 2007/0182403 A1 * | 8/2007 | von Hayn et al. .......... | 324/207.2 |
| 2008/0234908 A1 * | 9/2008 | St. Clair et al. .................. | 701/70 |

FOREIGN PATENT DOCUMENTS

| | | |
|---|---|---|
| DE | 10 2004 043 152 | 7/2005 |
| DE | 102004043152 | 7/2005 |
| DE | 10 2005 014 414 | 9/2006 |
| DE | 102005014414 | 9/2006 |
| WO | WO 02/43996 | 6/2002 |
| WO | WO 2006/100215 | 9/2006 |

OTHER PUBLICATIONS

English Abstract for WO 2006/100215 (Sep. 2006).
European Search Report dated Dec. 3, 2010, issued in related European Application No. 10 17 6427.

* cited by examiner

*Primary Examiner* — David D Le
*Assistant Examiner* — Jacob S Scott
(74) *Attorney, Agent, or Firm* — Stein IP, LLC

(57) ABSTRACT

The control apparatus for braking valves for operating machines includes a fluid valve having a control cursor for distributing the operating fluid, a control mechanism of the cursor that can be operated by an operator, sensor device sensitive to variations in the magnetic field and suitable for detecting the position of at least one between the control mechanism and the cursor, magnetic assembly operatively connected to between the control mechanism and the cursor for enabling the sensor device. The magnetic assembly includes a magnetic element which is arranged mobile inside a seat obtained in a support permeable to the magnetic field. The magnetic assembly also includes a sustaining element fitted for rotation in the seat and having a first extremity, that can be operated, in rotation, by the motion of the cursor and the control mechanism, A second extremity is associated with a magnetic element.

14 Claims, 2 Drawing Sheets

CONTROL APPARATUS FOR BRAKING VALVES FOR OPERATING MACHINES OR THE LIKE

CROSS-REFERENCE TO RELATED APPLICATIONS

The present invention claims the retroactive benefit of Italian patent application No. MO 2009 A000232, filed Sep. 17, 2009, the disclosure of which is incorporated herein by reference.

BACKGROUND

1. Field

The present invention relates to a control apparatus for braking valves for operating machines or the like.

2. Description of the Related Art

Many operating machines, such as fork-lift trucks, tractors, cranes and the like, envisage the possibility of controlling the transmission of the motion from the motor to the wheels electronically.

As the technician in the sector knows, these operating machines are equipped with a function called "inching" which allows the operator to reduce and control the speed of the operating machine by operating the brake pedal, thereby changing the transmission ratio.

During a first part of the stroke of the brake pedal, the "inching" function allows partializing the traction without operating the brakes.

More in particular, during the first part of the pedal stroke, the operator modulates the speed of the operating machine by adjusting the motion transmission speed, while in the second part of the stroke the further movement of the pedal involves the direct intervention of the brakes.

As the technician in the sector knows, the "inching" function is controlled by means of a control apparatus comprising:
- a fluid valve which is suitable for controlling the braking system of the operating machine and which is equipped with at least a distribution cursor of the operating fluid connected to the brake pedal;
- a potentiometer, in turn connected to the fluid valve or to the brake pedal, which is suitable for emitting an electric signal proportional to the movement of the brake pedal itself.

The electric signal emitted by the potentiometer is sent to the electronic unit which controls the traction, which has the job of regulating the transmission speed according to the signal received from the potentiometer.

In the operating machines of known type, the connection between the fluid valve or the brake pedal and the potentiometer is of the mechanical type.

More in particular, the control apparatus comprises mechanical means for transmitting the motion from the fluid valve cursor or from the brake pedal to the potentiometer.

The potentiometer takes the motion directly from the fluid valve cursor and the mechanical means which transfer the motion to the potentiometer can be of the rotary or linear type.

In this embodiment, the mechanical means which transfer the motion comprise a drive shaft, driven in rotation around its own axis by the cursor of the fluid valve, which mechanically couples with an outside element exiting from the potentiometer.

The movement of the cursor is transferred by means of the drive shaft to the outside element of the potentiometer which consequently emits an electric signal that varies in accordance with the movement of the outside element itself.

These known control apparatuses do have a number of drawbacks.

In particular, they are not very reliable due to possible oil leaks that can occur from the braking valve to the potentiometer.

In fact, notwithstanding the fact that a seal gasket is fitted on the drive shaft, it may occur, during use, that leaks occur due to wear, wrong assembly, a defect in the seal itself or other causes.

The obvious consequence of such leaks is the malfunction of the potentiometer and, therefore, of the control apparatus itself.

Another drawback of known types of control apparatus is due to the friction produced by the seal gasket on the connection shaft and which, besides causing the wear of the gasket itself, makes the movements of the connection shaft difficult.

Another drawback consists in the high construction complexity, which results in a complex assembly phase and, therefore, high costs that affect the end price of the apparatus itself.

Another type of control apparatus for braking valves is described by WO 0243996, DE 10 2005 014414 and DE 10 2004 043152.

These documents describe the use of a signalling device directly associated in translation with the distribution cursor of the operating fluid and of a detection sensor for detecting the movements of the signalling device.

More in particular, WO 0243996, considered as the closest known art, describes a control apparatus having a signalling element directly associated with the distribution cursor of the operating fluid, and therefore it too moving in translation inside the relative liner, and a sensor arranged outside the liner itself and suitable for detecting the movements of the signalling device.

By means of the position of the signalling device detected by the sensor, it is therefore possible to identify the position of the cursor.

The sensor device extends, outside the cursor liner, for a stretch substantially equal to the entire stroke of the cursor itself.

The apparatus described in WO 0243996 also has a number of drawbacks.

This apparatus, in fact, is complicated in terms of construction.

The complexity of such apparatus is also due to its structural conformation and in particular to the positioning and extension of the sensor arranged outside the cursor liner. In fact, as anticipated above, such sensor extends for a stretch substantially equal to the stroke of the cursor itself and therefore has considerable overall dimensions.

SUMMARY

The main aim of the present invention is to provide a control apparatus for braking valves for operating machines or the like which is able to overcome the drawbacks of the known art.

The present invention therefore intends providing a control apparatus that is constructively simpler with respect to apparatuses of known type and in particular with respect to the apparatus described in WO 0243996.

Within this aim, an object of the present invention is to provide a control apparatus which, during use, is considerably more reliable and safe with respect to the control apparatuses of known type.

Another object of the present invention is to isolate in a more reliable and safer way the potentiometer of the fluid valve, so as to reduce as much as possible the risk of leaks towards the potentiometer itself, while at the same time maintaining the complete functionality and efficiency of the control apparatus.

Yet another object of the present invention is to provide a control apparatus for braking valves for operating machines or the like which is simpler in terms of construction and manufacture compared to control apparatuses of known type and, therefore, also more economical.

The above objects are all achieved by the present control apparatus for braking valves for operating machines or the like, comprising a fluid valve suitable for controlling the braking system of an operating machine and having at least a control cursor for distributing the operating fluid, at least a control mechanism for controlling said cursor that can be operated by an operator, at least a sensor device suitable for detecting the position of at least one of said control mechanism and said cursor, magnetic means operatively connected to at least one of said control mechanism and said cursor and suitable for enabling said sensor device, the latter being sensitive to variations in the magnetic field and mechanical connection means for connecting said sensor device to at least one between said control mechanism and said cursor not being provided, wherein said magnetic means comprise at least a magnetic element which can be driven in movement by at least one of said cursor and said control mechanism, said magnetic element being arranged mobile inside a seat obtained in a support permeable to the magnetic field, and wherein said sensor device is associated with said support on a substantially opposite side compared to said seat and is suitable for detecting the variations in the magnetic field resulting from the movement of said magnetic element, characterized by the fact that said magnetic means comprise at least a sustaining element of said magnetic element, fitted turning in said seat and having a first extremity, that can be operated in rotation by the motion of at least one between said cursor and said control mechanism, and a second extremity, which is associated with said magnetic element.

BRIEF DESCRIPTION OF THE DRAWINGS

Other characteristics and advantages of the present invention will become more evident from the description of a preferred, but not sole, embodiment of a control apparatus for braking valves for operating machines or the like, illustrated purely as an example but not limited to the annexed drawings in which.

DETAILED DESCRIPTION

With particular reference to such figures, globally indicated by 1 is a control apparatus for braking valves for operating machines or the like.

The apparatus 1 is intended to be fitted on operating machines, e.g., of the type of fork-lift trucks, tractors, cranes or the like, having a hydraulically and/or pneumatically driven braking system and a wheeled motor traction system with transmission ratio controlled electronically by an electronic unit.

The apparatus 1, e.g., allows managing the so-called "inching" function to enable the operator who operates the braking system to reduce and control the speed of the operating machine by changing the transmission ratio.

In detail, the apparatus 1 comprises a fluid valve 2 suitable for controlling the braking system of the operating machine.

Figure 1:
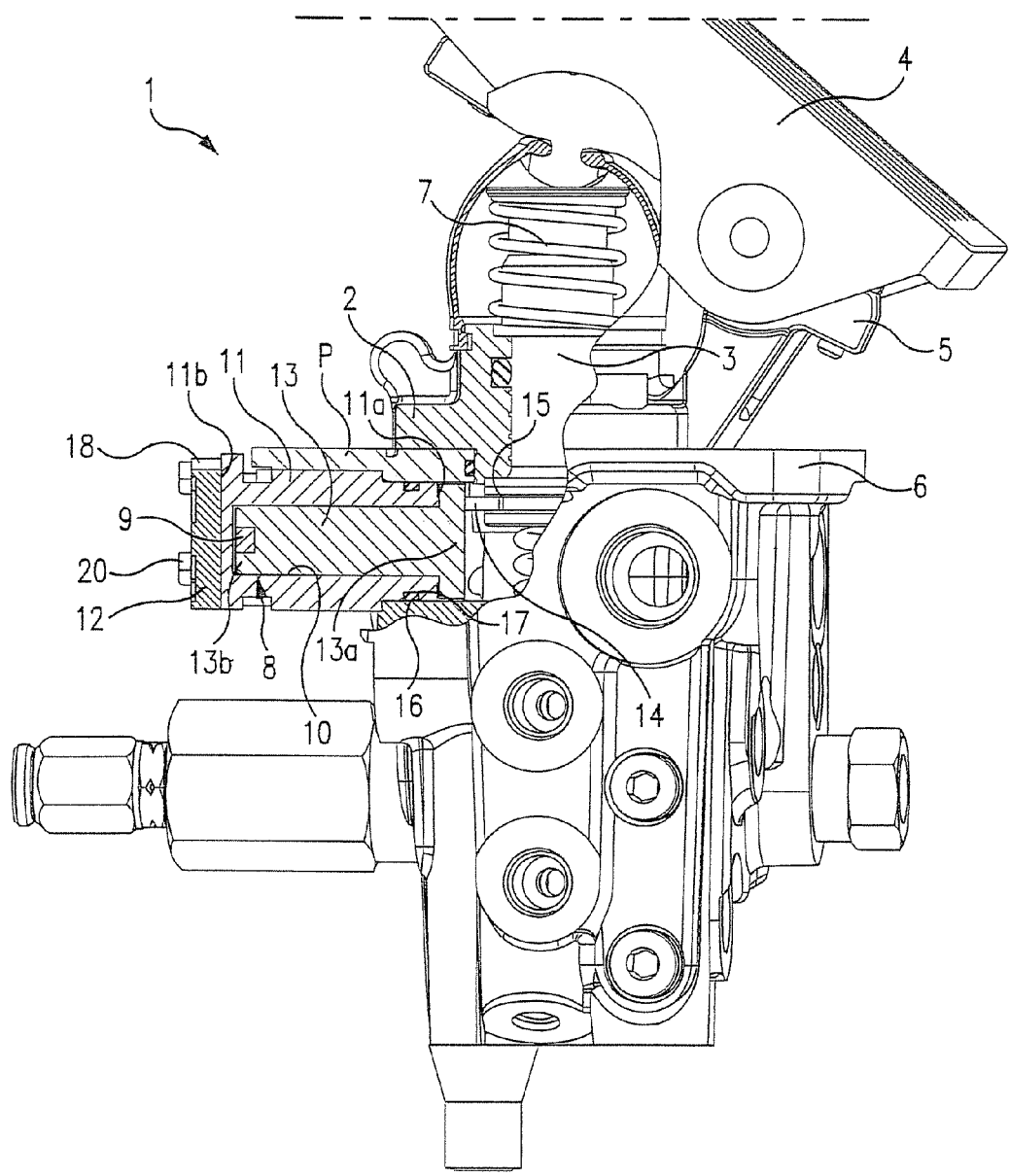
FIG. 1 is a longitudinal section view of the apparatus according to the invention.

The valve 2 shown in the FIG. 1 is a hydraulic valve but alternative embodiments cannot be ruled out in which this is of the pneumatic type.

The valve 2, in particular, comprises an outer body inside which is fitted sliding at least a control cursor 3 for the distribution of the operating fluid in the braking system.

To the outer body of the valve 2 is associated a control mechanism 4 of the cursor 3 which can be operated by an operator.

Simply by way of example, the control mechanism 4 is chosen from the list comprising: a pedal, a lever or the like.

In the particular embodiment shown in the FIG. 1, the control mechanism 4 is composed of a pedal hinged to a supporting element 5 in the proximity of a coupling body 6 which allows mounting the apparatus 1 on the floor P of a control station, e.g., a driving cab or the like, of the operating machine.

In particular, the coupling body 6, of the type of a perforated plate protruding from the outer body of the valve 2, is intended to be screwed onto the floor P so the pedal 4 remains above the floor P itself, with the outer body of the valve 2 at least partially housed underneath it.

Usefully, the pedal 4 is associated with the cursor 3 of the valve 2 so the variation in its angular position determines the vertical sliding of the cursor 3 inside the outer body of the valve 2.

More in particular, the pedal 4 is mobile between a raised position corresponding to its idle position and in which the condition of operation of the operating machine remains unaltered, and at least a lowered position, in which the pedal itself is rotated towards the coupling body 6 with respect to the raised position and causes the downward movement of the cursor 3.

Suitably, the valve 2 also comprises a return spring 7 fitted on the cursor 3 and suitable for contrasting the movement of the pedal 4 towards the lowered position.

The apparatus 1 also comprises a sensor device 12 suitable for detecting the position of at least one between the control mechanism 4 and the cursor 3 and advantageously suitable for electronically controlling the transmission of power in the traction system of the operating machine.

The sensor device 12 is connected to the outer body of the valve 2 below the coupling body 6, i.e., on the substantially opposite side of the pedal 4, so that this too is mounted underneath the floor P and therefore outside the control station of the operating machine and away from the operator driving the vehicle.

The apparatus 1 also comprises magnetic means 8 operatively connected to at least one between the control mechanism 4 and the cursor 3 and suitable for enabling the sensor device 12, the latter being sensitive to variations in the magnetic field. Between the sensor device 12 and at least one between the control mechanism 4 and the cursor 3, mechanical connection means are not therefore provided.

The magnetic means 8 comprise at least a magnetic element 9, which can be driven in movement by at least one between the control mechanism 4 and the cursor 3, and the sensor device 12 is suitable for detecting the variation in magnetic field resulting from the movement of the magnetic element 9.

Preferably, the magnetic element 9 is composed of a permanent magnet and the sensor device 12 is of the Hall effect type. Different embodiments cannot however be ruled out in which, e.g., the magnetic element 9 is composed of an electromagnet or the like.

More in particular, the magnetic element 9 is arranged mobile inside a seat 10, obtained in a support 11 made of a non-magnetic material permeable to the magnetic field, and the sensor device 12 is associated with the support 11 on the substantially opposite side compared to the seat 10.

According to the invention, the magnetic means 8 comprise at least a sustaining element 13 which can be fitted turning inside the seat 10 and having a first extremity 13a, which can be operated in rotation by the motion of the cursor 3 and the control mechanism 4, and a second extremity 13b, which is associated with the magnetic element 9.

More in detail, in the preferred embodiment shown in the illustrations, the seat 10 has a substantially cylindrical shape, with round section and symmetry axis positioned at right angles to the sliding direction of the cursor 3, and the sustaining element 13 is composed of a spindle, this too substantially cylindrical. In this embodiment, the spindle 13 is fitted substantially to measure in the seat 10 and the magnetic element 9 is moving in rotation around the symmetry axis of the seat itself. Different embodiments cannot however be ruled out in which the seat 10 and the sustaining element 13 are of different shape with respect to that shown in the attached illustrations.

The spindle 13, arranged moving inside the seat 10, is suitably made of non-magnetic material and integrally supports in rotation the magnetic element 9.

The sensor device 12, preferably of the Hall effect type, is therefore sensitive to the variation in the magnetic field resulting from the rotation of the magnetic element 9 around the symmetry axis of the seat 10.

Usefully, the first extremity 13a is driven by the motion of the cursor 3 and, for this purpose, comprises an eccentric pin 14; in this respect it must be specified that in the present treatise the term "eccentric" must be evaluated with reference to the rotation axis of the spindle 13.

Figure 2:
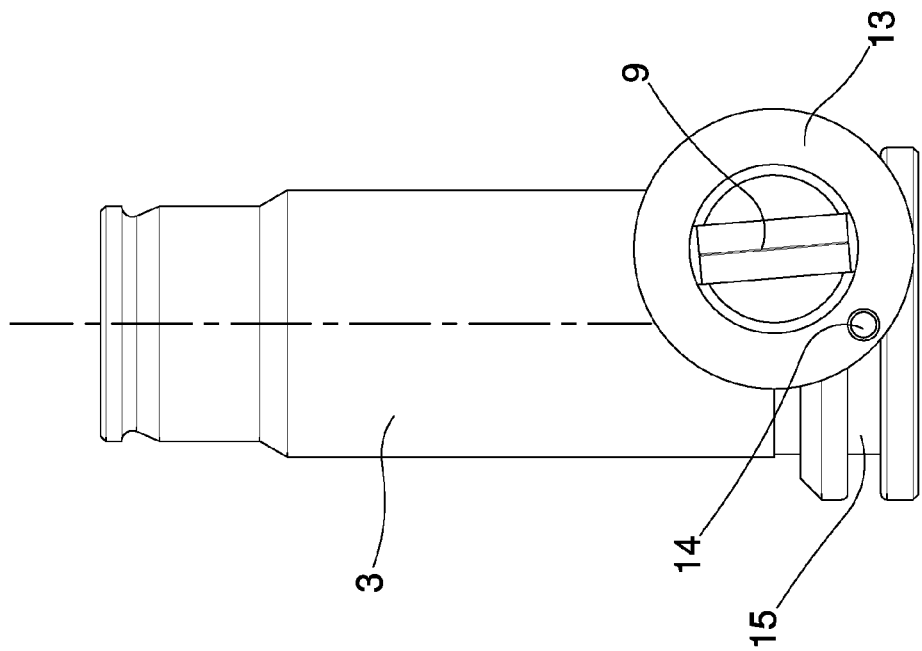
FIG. 2 and FIG. 3 are two partial views of the apparatus according to the invention, that show the principle of the transfer of the cursor motion to the magnetic element.
Figure 3:
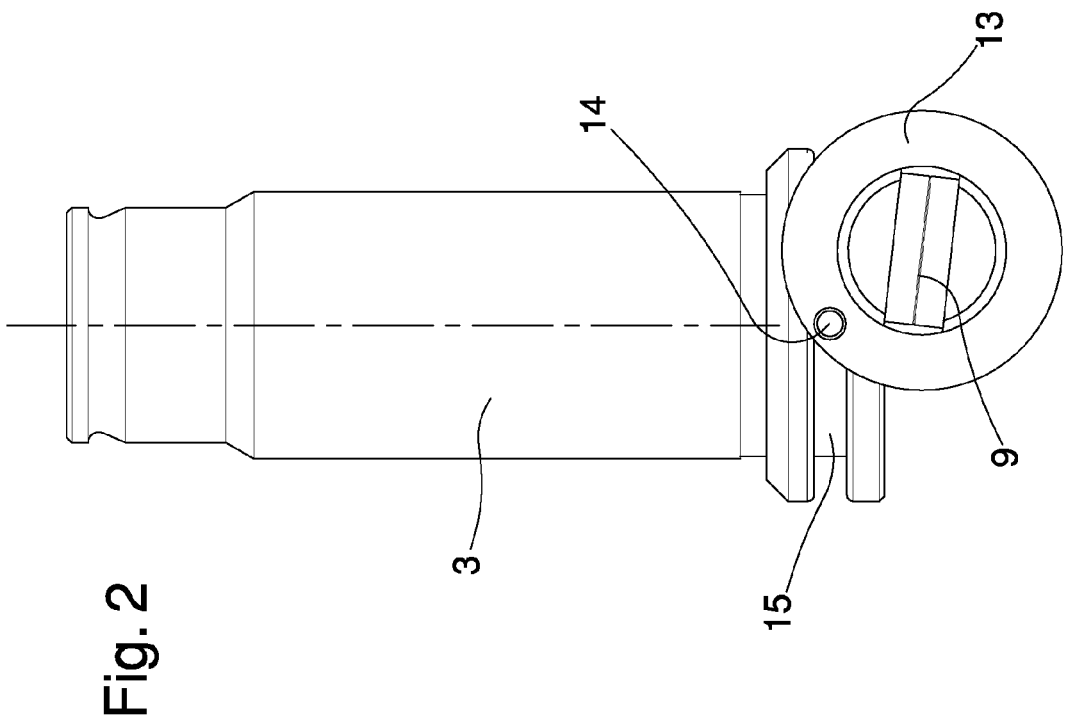

As is shown in the FIGS. 2 and 3, the eccentric pin 14 is engaged in a corresponding drive race 15 which is obtained in the cursor 3 and which allows driving the eccentric pin itself during the sliding of the cursor 3 in the outer body of the valve 2.

For this purpose, the eccentric pin 14 is arranged substantially crossways to the sliding direction of the cursor 3 and is suitable for transforming such sliding into the rotation of the spindle 13.

The eccentric pin 14 is then made to rotate around the symmetry axis of the seat 10 by the linear movement of the cursor 3 and drives in its motion of rotation both the spindle 13 and the magnetic element 9.

Advantageously, the support 11 consists of a single rigid body, with a round-section substantially cylindrical shape, which has a first side 11a, on which opens the seat 10, and a second side 11b, which is opposite the first side 11a and is closed.

The seat 10 is therefore obtained in the support 11 starting from the first side 11a and has a blind bottom.

In the proximity of the first side 11a the support 11 has coupling means for coupling to the outer body of the valve 2, not visible in detail in the FIG. 1.

For the correct operation of the valve 2, gasket means 16, 17 are provided placed between its outer body and the support 11.

Such gasket means 16, 17, are composed of a seal ring 16 which can be placed in a corresponding groove 17 obtained on the lateral surface of the support 11.

The sensor device 12 comprises an air-tight protective wrapping 18 in which are drowned the electronic components of the Hall effect sensor and from which exit the power connection cables to the electronic unit, not shown for the sake of simplicity in the FIG. 1.

The wrapping 18 has a substantially plate shape and is associable with the second side 11b of the support 11 by means of screw means 20.

In actual fact, the magnetic element 9 generates a magnetic field able to cross the support 11 and the wrapping 18 in order to strike and excite the electronic components of the sensor device 12.

For this purpose, the support 11, as well as the spindle 13, is made of a material permeable to the magnetic field, e.g., aluminium.

It has in point of fact been ascertained how the described invention achieves the proposed objects and in particular the fact is underlined that the control apparatus according to the present invention is characterised by safe and reliable operation due in particular to the magnetic type connection between the control mechanism of the operating machine and the sensor device connected to the electric unit of the operating machine itself.

In particular, the absence of a mechanical connection of any type between the fluid valve cursor and the sensor device allows avoiding the risk of any oil leaks towards the sensor device itself and therefore ensures a safer operation of the control apparatus and therefore of the operating machine.

Again, the absence of gaskets and seal bodies directly mounted on the shaft, or in any case on the element connected to the control mechanism and suitable for exciting the sensor device, allows the shaft itself to move more easily inside the relevant seat and therefore a more precise and effective detection of the movements of the control mechanism.

The structure of the sensor device forming the subject of the present invention, and in particular the rotation of the magnetic element inside the housing seat of the relevant sustaining element, permits considerably reducing the overall dimensions compared to devices of known type and at the same time obtaining a precise and reliable detection.

It follows therefore that the sensor device described and claimed herein appears characterised by a structure that is considerably simpler from a construction viewpoint than that of known devices and, at the same time, by precise and effective operation.

The positioning of the sensor device outside the body of the fluid valve and the absence of mechanical connections with elements inside the valve itself, or more in general, with the control mechanism of the operating machine, allows making the maintenance operations in the sensor device itself considerably easier and consequently reduces the relevant costs and machine down times.

What is claimed is:

1. A control apparatus (1) for braking valves for operating machines, comprising
a fluid valve (2) for controlling a braking system of an operating machine and having at least a control cursor (3) for distributing an operating fluid,
at least a control mechanism (4) for controlling said cursor (3), at least a sensor device (12) for detecting the position of at least one of said control mechanism (4) and said cursor (3), magnetic means (8) operatively connected to at least one of said control mechanism (4) and said cursor (3) for cooperation with said sensor device (12), said sensor device being sensitive to variations in a magnetic field, wherein said magnetic means (8) comprises at least a magnetic element (9) which is driven in movement by at least one of said cursor (3) and said control mechanism (4), said magnetic element (9) being arranged mobile inside a seat (10) obtained in a support (11) permeable to the magnetic field, and wherein said sensor device (12) is associated with said support (11) on a substantially opposite side compared to said seat (10) and is suitable for detecting the variations in the magnetic field resulting from the movement of said magnetic element (9), and wherein said magnetic means (8) further comprises a sustaining element (13) of said magnetic element (9), fitted turning in said seat (10) and having a first extremity (13*a*), that is operated in rotation by the motion of at least one of said cursor (3) and said control mechanism (4), and a second extremity (13*b*), which is associated with said magnetic element (9).

2. The apparatus according to claim 1, wherein said first extremity (13*a*) comprises at least an eccentric pin (14) engaged in at least a corresponding drive race (15) of said cursor (3).

3. The apparatus (1) according to claim 2, wherein said eccentric pin (14) is substantially crossways to the sliding direction of said cursor (3) and transforms the sliding of said cursor (3) into the rotation of said sustaining element (13).

4. The apparatus (1) according to claim 1, wherein said seat (10) and said sustaining element (13) are substantially cylindrical.

5. The apparatus according to claim 1, wherein said sensor device (12) is a Hall effect type.

6. The apparatus (1) according to claim 1, wherein said support (11) is obtained in a single rigid body piece.

7. The apparatus (1) according to claim 1, wherein said support (11) has a first side (11*a*), on which opens said seat (10), and a second side (11*b*), which is opposite the first side (11*a*) and is closed, said support (11) comprising coupling means for said fluid valve (2) arranged in the proximity of said first side (11*a*).

8. The apparatus (1) according to claim 1, further comprising gasket means (16, 17) located between said fluid valve (2) and said support (11).

9. The apparatus (1) according to claim 8, wherein said gasket means (16, 17) further comprises at least a seal ring (16) is located in a groove (17) obtained on the lateral surface of said support (11).

10. The apparatus (1) according to claim 1, wherein said sustaining element (13) is made of a material permeable to the magnetic field.

11. The apparatus (1) according to claim 7, wherein said sensor device (12) is associated with said second side (11*b*) of the support (11).

12. The apparatus (1) according to claim 1, wherein said sensor device (12) further comprises an air-tight protective wrapping (18) associated with said support (11) by means of screws (20).

13. The apparatus (1) according to claim 1, wherein said control mechanism (4) comprises a pedal associated with said fluid valve (2), and said sensor device (12) is associated with said fluid valve (2).

14. The apparatus (1) according to claim 13 wherein said pedal (4) is mobile between a raised position and a lowered position and said fluid valve (2) comprises a return spring (7) associated with said cursor (3) for opposing the movement of said pedal (4) towards a lowered position.

* * * * *